United States Patent
Kashiwagi

[11] Patent Number: 5,882,568
[45] Date of Patent: *Mar. 16, 1999

[54] METHOD AND MOLDING MACHINE FOR MANUFACTURING SHAPED ARTICLES COMPRISED OF POLYMERIC MATERIAL

[75] Inventor: Hiroshi Kashiwagi, Nagoya, Japan

[73] Assignee: NGK Insulators, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 615,998

[22] Filed: Mar. 18, 1996

[30] Foreign Application Priority Data

Mar. 20, 1995 [JP] Japan .................................. 7-060414

[51] Int. Cl.⁶ .................................................. B29C 45/40
[52] U.S. Cl. ........................ 264/275; 264/279; 264/328.1; 264/334; 425/116; 425/129.1; 425/443; 425/444; 425/556
[58] Field of Search ................................ 425/116, 129.1, 425/556, 444, 438, 441, 443; 264/328.1, 334, 264, 275, 278, 279

[56] References Cited

U.S. PATENT DOCUMENTS

| | | | |
|---|---|---|---|
| 3,587,144 | 6/1971 | Meching ................................ | 425/443 |
| 4,176,151 | 11/1979 | Suzuki ................................... | 264/334 |
| 4,257,145 | 3/1981 | Bovino .................................. | 425/444 |
| 4,555,086 | 11/1985 | Kiyotomo ............................. | 425/116 |
| 4,702,873 | 10/1987 | Kaczerginski ........................ | 264/278 |
| 4,723,899 | 2/1988 | Osada .................................... | 425/116 |
| 4,755,128 | 7/1988 | Alexander et al. .................... | 425/444 |
| 4,793,785 | 12/1988 | Osada .................................... | 425/116 |
| 4,812,114 | 3/1989 | Kennon et al. ........................ | 425/116 |
| 4,988,280 | 1/1991 | Giza ....................................... | 264/334 |
| 5,087,188 | 2/1992 | Staver ..................................... | 425/444 |
| 5,171,585 | 12/1992 | Onisawa et al. ....................... | 264/334 |
| 5,227,178 | 7/1993 | Rieker .................................... | 425/556 |
| 5,238,377 | 8/1993 | Adkins et al. ......................... | 425/116 |
| 5,470,596 | 11/1995 | Jones ...................................... | 425/444 |
| 5,523,038 | 6/1996 | Kunieda et al. ....................... | 425/116 |

FOREIGN PATENT DOCUMENTS 63-128916  6/1988  Japan .

OTHER PUBLICATIONS

Rosato, Donald V., et al., Injection Molding Handbook, pp. 282 and 283, 1995.

*Primary Examiner*—Jill L. Heitbrink
*Attorney, Agent, or Firm*—Parkhurst & Wendel, L.L.P.

[57] ABSTRACT

A molding machine for manufacturing a shaped article which is comprised of a polymeric material and formed in a mold cavity between first and second mold halves of a mold assembly. At least one spring-loaded ejector member is provided in the first mold half and serves to eject the shaped article therefrom. The ejector member is movable toward and away from the second mold half and operates when the two mold halves are being opened. At least one resilient member urges the ejector member toward the second mold half. The resilient member exerts a resilient force to the ejector member, which is smaller than a tightening force of the mold halves. A method for manufacturing a shaped article comprised of a polymeric material includes providing at least one ejector member in the first mold half of the molding machine such that as the mold halves are opened, the ejector member urges the insulator away from the first mold half in which the ejector member is disposed. In one embodiment, the insulator is ejected by use of an ejection member having a distal end that is curved, thereby minimizing damage to the composite insulator.

9 Claims, 2 Drawing Sheets

FIG_1 even-1in number5,882,568

METHOD AND MOLDING MACHINE FOR MANUFACTURING SHAPED ARTICLES COMPRISED OF POLYMERIC MATERIAL

BACKGROUND OF THE INVENTION

1. Field of the Invention

The present invention relates to a molding machine for manufacturing shaped articles comprised of a polymeric material, such as composite electrical insulators. More particularly, the present invention pertains to an apparatus for reliably removing a shaped article from the mold halves, which is compact and simple in structure.

2. Description of Related Art

There is known a composite electrical insulator which can be obtained by integrally providing an elongate core rod of fiber-reinforced plastics (FRP) with a sheath and sheds by injection or transfer molding of appropriate polymeric material having an electrically insulating property, such as silicone rubber, ethylene propylene copolymer (EPM), ethylene propylene diene copolymer (EDPM), polyurethane, etc. Such a composite insulator has been actually put into practical applications, particularly in any use environment which can draw out various functional advantages of the composite insulator.

In order to manufacture composite insulators, there is typically used a mold assembly which includes upper and lower mold halves defining a mold cavity when they are tightened and thereby closed. The polymeric material for the composite insulator tends to remain attached to the mold halves, even when a releasing agent is applied to the inner surface of the mold cavity before the molding step. Thus, when the molding halves are being opened, the composite insulator as a whole or in its end portion may remain attached to the upper mold half. When the entire composite insulator remains attached to the upper mold half, the composite insulator has to be removed from the upper mold half by performing a troublesome manual operation on the parting surface on the lower side of the upper mold half, while carefully preventing the composite insulator from being dropped onto the lower mold half. On the other hand, when the end portion of the composite insulator remains attached to the upper mold half, the composite insulator may be applied with a severe twisting force or it may be dropped onto the lower mold half during the opening process of the mold, so that the core rod and/or sheds of the composite insulator may be subjected to deformation or damages.

In order to avoid these drawbacks, it has been a typical practice to insert an appropriate tool into a space between the upper and lower mold halves as they are slightly opened, so as to urge the composite insulator against the lower mold half while displacing the upper mold half away from the lower mold half, and thereby remove the composite insulator from the upper mold half. On this instance, when the composite insulator is in tight attachment to the upper mold half, it may still be applied with a severe twisting force during removal of the composite insulator.

An alternative approach is to temporarily connect retainer rings to the end portions of the core rod, which are then detachably connected to the lower mold half so that the composite insulator can be forcibly removed from the upper mold half as the latter is displaced away from the lower mold half. However, this approach requires additional manual steps to be performed during preparation of molding and upon removal of the composite insulator.

DISCLOSURE OF THE INVENTION

It is therefore a primary object of the present invention to provide an improved molding machine which is compact and simple in structure and in which a shaped article formed in the mold cavity can be positively maintained in one of the mold halves without application of severe force to the shaped article or without requiring troublesome manual steps before and after the molding process.

Briefly stated, the present invention provides an improved molding machine for manufacturing a shaped article which is comprised of a polymeric material. The molding machine includes a mold assembly comprised of a first mold half and a second mold half which are opposed to, and tightened with each other with a predetermined tightening force so as to define a mold cavity therebetween, in which a polymeric material is molded to form a shaped article.

According to the present invention, the molding machine comprises at least one ejector member for ejecting the shaped article from the first mold half. The ejector member is provided for the first mold half so as to be movable toward and away from the second mold half, and operative when the two mold halves are being opened. The molding machine further comprises at least one resilient member for urging the ejector member toward the second mold half. The resilient member exerts a resilient force to the ejector member, which is smaller than the tightening force of the mold halves.

With such an arrangement of the molding machine according to the present invention, when the two mold halves are tightened with each other to define a mold cavity therebetween, the ejector member provided for the first mold half is retracted away from the second mold half against the resilient force of the resilient member, because the resilient force applied by the resilient member to the ejector member is smaller than the tightening force of the mold halves. A polymeric material is injected into the mold cavity to form a shaped article. After formation of the shaped article in the mold cavity, the tightening force is released from the mold halves in order to open the mold assembly and remove the shaped article from the mold cavity. On such occasion, the ejector member urged by the resilient member is projected toward the second mold half while being maintained in engagement with the shaped article. Thus, the shaped article is smoothly ejected from the first mold half as the two mold halves are being opened, and is left on the second mold half when the two mold halves are fully opened. The shaped article can be removed from the mold assembly without being subjected to a severe force or without requiring troublesome manual steps before or after the molding process.

According to a preferred embodiment of the present invention which is particularly suitable for manufacturing a composite insulator, the ejector member is arranged in a longitudinal end region of the mold cavity. The composite insulator comprises a core rod having a center region on which the polymeric material is molded and a longitudinal end portion which is not covered by the polymeric material. The first and second mold halves are adapted to retain the core rod with an end ring temporarily placed on the end portion of the core rod. The ejector member is arranged so as to be engageable with the end ring on the core rod.

In this instance, for ejecting the composite insulator from the first mold half, the ejector member is advantageously engaged with the end ring on the core rod. The end ring is relatively rigid as compared to the sheath or sheds on the core rod which are comprised of relatively soft and flexible polymeric material, particularly when the polymeric material has not yet been completely cured. Thus, by engaging the ejector member with the end ring on the core rod, the composite insulator can be ejected from the first mold half without causing damages which might be likely to occur when the ejector member were engaged with the sheath or sheds on the core rod.

A particularly compact arrangement of the molding machine can be realized when the ejector member and the associated resilient member are accommodated within the first mold half.

The molding machine according to the present invention may further comprise at least one additional ejector member for ejecting the shaped article from the second mold half. Such additional ejector member is provided for the second mold half so as to be movable moved toward and away from the first mold half and operative when the two mold halves have been fully opened.

BRIEF DESCRIPTION OF THE DRAWINGS

The present invention will be described below with reference to a specific embodiment shown in the accompanying drawings, in which.

DETAILED DESCRIPTION OF THE PREFERRED EMBODIMENT

Figure 1:
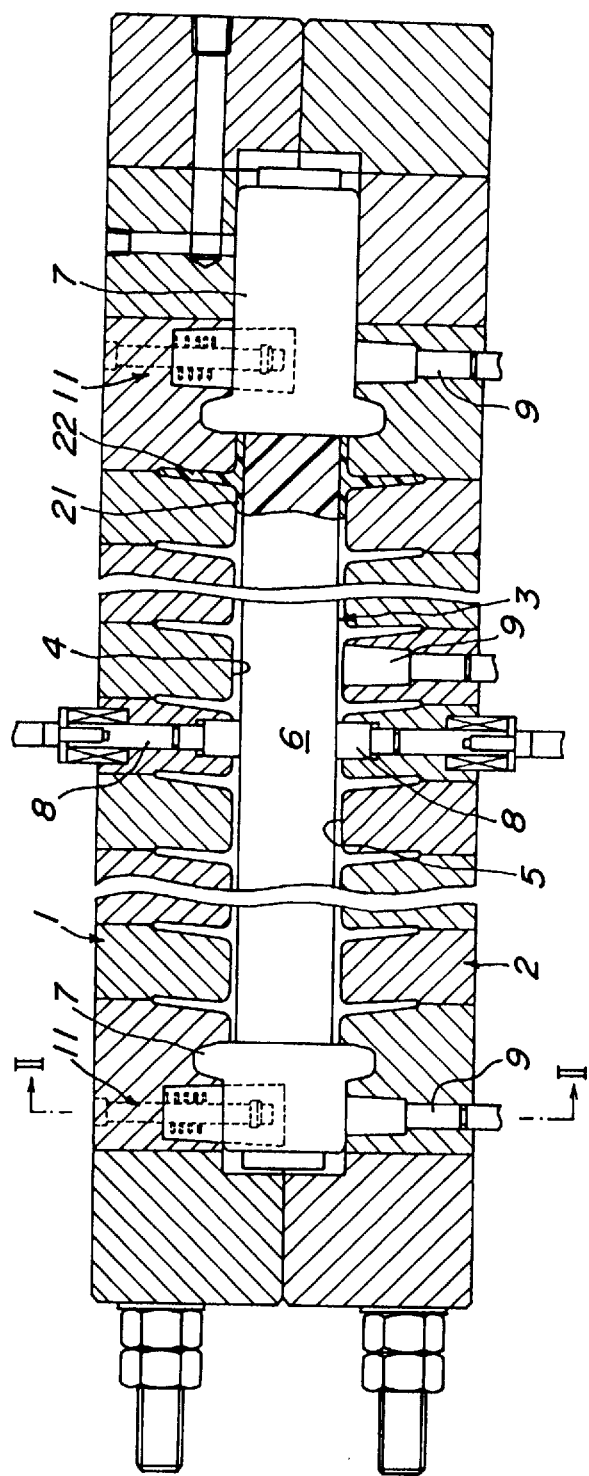
FIG. 1 is a longitudinal sectional view showing the mold assembly of a molding machine according to one embodiment of the present invention.
Figure 2:
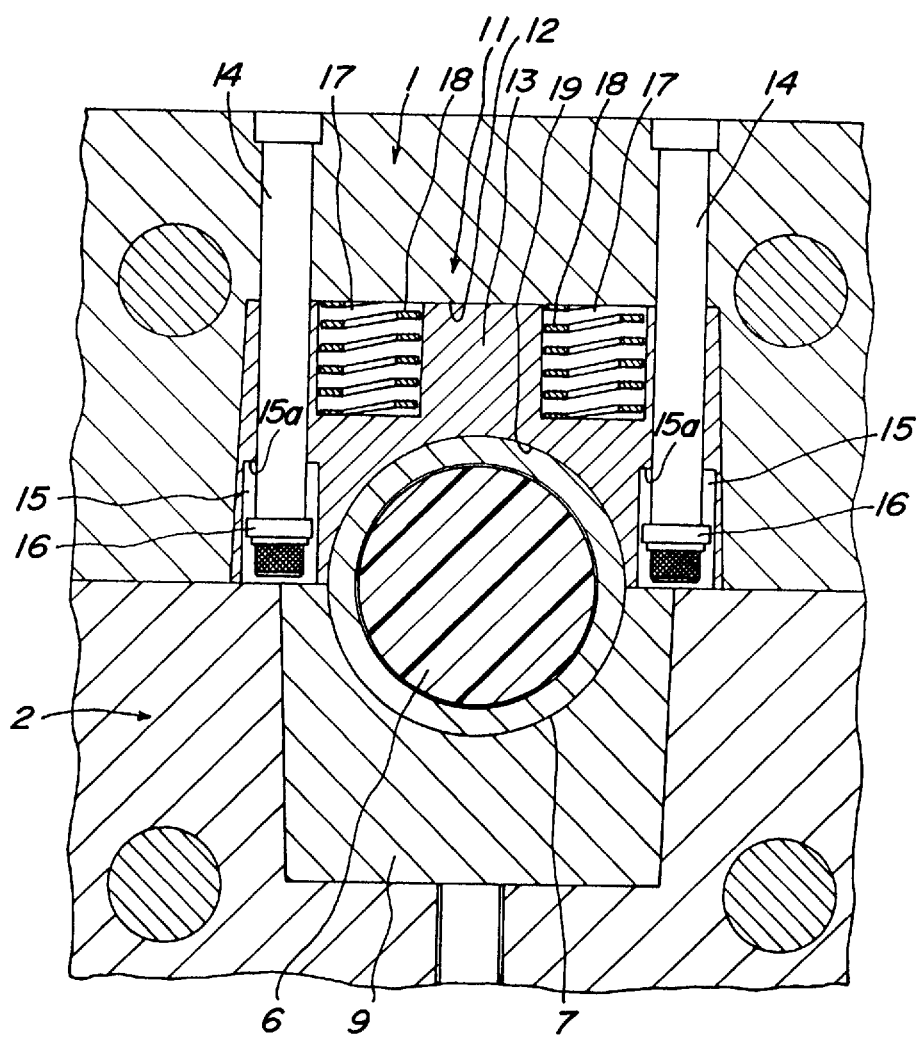
FIG. 2 is a cross-sectional view taken along the line II—II in FIG. 1.

Referring now to FIGS. 1 and 2, there is shown a mold assembly according to one embodiment of the present invention, which forms part of a transfer or injection molding machine. The mold assembly comprises an upper mold half 1 and a lower mold half 2 which are tightened with respect to each other as shown in FIGS. 1 and 2, so that a mold cavity 3 is defined by an inner surface of the upper mold half 1 and an opposite inner surface of the lower mold half 2. In order to open the mold assembly, at least one of the upper and lower mold halves 1,2 is moved away from the other. In the illustrated embodiment, it may be assumed that the mold assembly is opened by moving the lower mold half 2 downwards while maintaining the upper mold half 1 stationary.

The molding machine further includes runner and the like passages for a polymeric material having an electrically insulating property, which is to be introduced into the mold cavity 3, such as silicone rubber, ethylene propylene copolymer (EPM), ethylene propylene diene copolymer (EDPM), polyurethane, etc., as well as heating and cooling devices for the mold assembly, which are conventional in the art. Therefore, for the sake of simplicity, these elements are omitted in the drawings.

In a tightened state of the mold assembly as shown in FIGS. 1 and 2, before a polymeric material is introduced into the mold cavity 3, a core rod 6 comprised of a fiber-reinforced plastic (FRP) material is positioned in the center portion of the mold cavity 3, together with end rings 7 which are temporarily fitted onto the longitudinal end portions of the core rod 6 so as to prevent the polymeric material from being molded on the end portions of the core rod 6.

The mold assembly further includes upper and lower support members 8 which can be projected radially inwards to support the core rod 6 and prevent it from deformation or deflection during injection or introduction of the polymeric material into the mold cavity 3. The support members 8 can be retracted radially outwards in the final stage of injection or introduction of the polymeric material. A molding machine provided with such support members is more fully disclosed in the applicant's U.S. patent application No. 08/473,982 filed Jun. 7, 1995, now abandoned the disclosure of which is herein incorporated by reference.

The lower mold half 2 is provided with ejector members 9 which are operative when the mold assembly is fully opened, for removing the composite insulator from the inner surface 5 of the lower mold half 2 by lifting it to a predetermined level. The ejector members 9 are actuated by an appropriate drive device, not shown, which may be a pneumatic or hydraulic cylinder or other mechanical means.

In the illustrated embodiment of the present invention, the upper mold half 1 is provided with ejector devices 11 at its end regions corresponding to the end rings 7 on the core rod 6. As particularly shown in FIG. 2, each ejector device 11 is accommodated in a recess 12 formed in the upper mold half 1. The ejector device 11 includes an ejector plate 13 which is movable in a direction perpendicular to the parting surface of the upper and lower mold halves, i.e., toward and away from the lower mold half 2.

The ejector plate 13 is guided by two guide rods 14 which are fixedly secured to the upper mold half 1 and vertically passed through bores in the ejector plate 13. The lower region of the bore in the ejector plate 13 is formed as a large diameter portion 15. Each guide rod 14 has a free end provided with a flange 16 which is situated within a large diameter portion 15 of the bore in the ejector plate 13. As will be more fully described hereinafter, when the ejector plate 13 is projected toward the lower mold half 2, the flange 16 of the guide rod 14 is brought into abutment with an end wall 15a of the large diameter portion 15 of the bore in the ejector plate 13, which is in the form of a shoulder. The flange 16 thus functions as a stopper which serves to limit a further movement of the ejector plate 13.

Each ejector plate 13 has an upper region which is provided with two depressions 17. Resilient members 18 are arranged between the bottom walls of the respective depressions 17 in the ejector plate 13 and the top wall of the recess 12 in the upper mold half 1. The resilient member 18 may be in the form of a compression coil spring. The spring force of the resilient member 18 is determined so that the resultant spring force of the entire resilient members 18 is smaller than the tightening force of the upper and lower mold halves 1,2, but greater than a force required for removing the composite insulator from the upper mold half 1.

According to another embodiment, not shown, the depressions 17 for the resilient members 18 are in the upper mold half 1 so that they are contiguous with the recess 12. In this case, the depressions 17 may be formed around the guide rods 14 so that the resilient members 18 are arranged coaxial to the respective guide rods 14. According to still another embodiment, not shown, the depressions 17 are formed in the upper region of the ejector plate 13 around the guide rods 14 so that the resilient members 18 are arranged coaxial to the respective guide rods 14. In these embodiments, the depressions 17 can be formed with minimized machining steps as compared with the depressions 17 which are formed separately from the bores for the guide rods 14 as in the illustrated embodiment.

As mentioned above, the resultant spring force of the entire resilient members 18 is smaller than the tightening force of the upper and lower mold halves 1, 2. Therefore, when the mold assembly is closed under the tightening force, the ejector plate 13 is completely retracted within the recess 12 in the upper mold half 1 against the spring force of the resilient members 18. On the other hand, when the tightening force is relieved and the mold assembly is being opened, the ejector plate 13 is projected toward the lower mold half 2 under the spring force of the resilient members 18. On such occasion, the projection amount of the ejector plate 13 is limited by the flanges 16 at the end portions of the guide rods 14 as they are brought into contact with the end wall of the large diameter portion 15 of the bore in the ejector plate 13.

Each ejector plate 13 has a lower edge 19 which is of a semi-circular shape corresponding to the outer peripheral surface of the end ring 7. Such semi-circular shape at the lower edge 19 of the ejector plate 13 ensures that the ejector plate 13 achieves a surface contact with the end ring 7, with a desired surface area.

According to another embodiment of the present invention (not shown), the ejector plate 13 is arranged so that it can be brought into direct contact with the end portion of the core rod 6 which is to be maintained uncovered by the polymeric material, or into contact with the sheath formed on the core rod 6. In these instances, the radius of semi-circle at the lower edge 19 of the ejector plate 13 should be changed corresponding to that of the core rod 6 or the sheath.

The operation of the ejector device 11 in the illustrated embodiment of the mold assembly will be explained below.

First of all, in an open state of the mold assembly, a core rod 6 temporarily fitted with the end rings 7 on its longitudinal end portions is placed on the inner surface 5 of the lower mold half 2. Thus, when the mold assembly is tightened and thereby closed, the core rod 6 is positioned at the center of the mold cavity 3. The core rod 6 within the mold cavity 3 is supported by the support members 8 when they are projected radially inwards. In this instance, the ejector plate 13 provided for the upper mold half 1 is retracted upwards against the spring force of the resilient members 18, and completely accommodated within the recess 12 with its lower edge in contact with the outer surface of the end ring 7 and partly with the lower mold half 2. The polymeric material is then injected or introduced into the mold cavity 3 and the support members 8 are retracted radially outwards in the final stage of injection or introduction of the polymeric material. The polymeric material which has been injected or introduced is cured within the mold cavity 3.

As the curing of the polymeric material is substantially completed within the mold cavity 3, a sheath 21 and sheds 22 are formed on the core rod 6, as shown in FIG. 1. Then, the tightening force is relieved from the mold assembly and the lower mold half 2 is moved downwards away from the upper mold half 1 to open the mold assembly. On such occasion, following the downward movement of the lower mold half 2, the ejector plate 13 is gradually projected from the recess 12 in the upper mold half 1 toward the lower mold half 2, under the restoring force of the resilient members 18. Since the lower semi-circular edges 19 of the ejector plates 13 are in contact with the end rings 7 on the longitudinal end portions of the core rod 6, the composite insulator which has been shaped within the mold cavity 3 is forcibly, yet smoothly removed from the upper mold half 1 while being maintained tightly urged against the inner surface 5 of the lower mold half 2. During removal of the composite insulator from the upper mold half 1, the composite insulator is applied with the spring force of the resilient members 18 through the end rings 7 on both end portions of the core rod 6. Therefore, the composite insulator is prevented from being applied with undesirable external force such as twisting force.

The downward projecting movement of the ejector plate 13 toward the lower mold half 2, under the restoring force of the resilient members 18, is continued until the flange 16 of the guide rod 14 is brought into abutment with an end wall 15a of the large diameter portion 15 of the bore in the ejector plate 13. On this occasion, the mold assembly is completely opened and the composite insulator is fully removed from the upper mold half 1. The ejector plate 13 is then maintained in its projected position until the mold assembly is tightened and closed once again. In other words, the ejector plate 13 is moved against the spring force of the resilient members 18 to its retracted position within the recess 12 as shown in FIGS. 1 and 2, when the mold assembly is closed by the tightening force.

After the mold assembly has been completely opened with the composite insulator fully removed from the upper mold half 1, the ejector members 9 provided for the lower mold half 2 are actuated to lift the composite insulator from the inner surface 5 of the lower mold half 2. The composite insulator is then ready for removal from the mold assembly. After the composite insulator has been removed from the mold assembly and the end rings 7 are disengaged from the end portions of the core rod 6, appropriate metal fittings are fixedly secured to the end portions of the core rod 6 to form the final product, e.g., by a crimping process as disclosed in U.S. Pat. No. 4,654,478.

It will be appreciated from the foregoing description that the present invention provides an improved molding machine which is compact and simple in structure and in which a shaped article formed in the mold cavity can be positively maintained in one of the mold halves without application of severe force to the shaped article and without requiring troublesome manual steps before and after the molding process.

While the present invention has been described with reference to specific embodiments, it should be noted that they were presented by way of examples only and various modifications and/or changes may be made without departing from the scope of the invention as defined by the appended claims. For example, the spring-loaded ejector device may be arranged on an exterior side of a mold half so as to be engageable with the longitudinal end portions of a core rod, instead of being arranged within a recess in the mold half.

I claim:

1. A method of producing a composite insulator, comprising the steps of:

providing a horizontally-disposed mold assembly including a first upper mold half and a second lower mold half opposed to each other;

tightening the mold halves together with a predetermined tightening force thereby defining a mold cavity extending along a longitudinal axis;

arranging at least one ejector member in at least one longitudinal end region of the mold cavity;

arranging a core rod having a center region on which polymeric material to be molded and at least one longitudinal end portion not to be covered by polymeric material, and adapting the first and second mold halves to retain the core rod with at least one end ring disposed on the at least one end portion of the core rod;

arranging the at least one ejector member to be engageable with the at least one end ring on the core rod;

providing a resilient means in cooperation with the at least one ejector member for urging the at least one ejector member toward the second mold half, the resilient means exerting a resilient force to the at least one ejector member, which force is less than the tightening force of the mold halves;

retracting the at least one ejector member against the resilient force of the resilient means wherein a part of the distal portion of the at least one ejector member contacts the second lower mold half and the other distal portion retains the core rod with the at least one end ring when the mold halves are closed;

injecting a polymeric material into the mold cavity thereby forming a composite insulator;

opening the mold halves and ejecting the composite insulator from the first mold half by operation of the at least one ejector member provided in the first mold half, the at least one ejector member being movable toward and away from the second mold half and operative when the first and second mold halves are being opened, the at least one ejector member having an arcuate shape at a distal portion thereof that is opposed to the second mold half, the arcuate shape corresponding to a portion of a composite insulator; and removing the composite insulator from the first upper mold half by applying the resilient force to the at least one ejector member during the opening of the mold halves so as to urge the composite insulator against the second lower mold half.

2. The method of claim 1, further comprising providing a stopper means which is engageable with the at least one ejector member for limiting movement of the at least one ejector member toward the second mold half.

3. The method of claim 1, further comprising accommodating the at least one ejector member within the first mold half.

4. The method of claim 1, further comprising providing another similarly-operative ejector member for ejecting the composite insulator from the second mold half.

5. The method of claim 1, wherein the arcuate shape is semicircular.

6. A method of producing a composite insulator, comprising the steps of:

providing a horizontally-disposed mold assembly including a first upper mold half and a second lower mold half opposed to each other and defining a mold cavity therebetween extending along a longitudinal axis;

providing at least one ejector means in each of the first and second mold halves, the first ejector means being disposed in the first mold half and movable toward and away from the second mold half and operative when the two mold halves are being opened, and the second ejector means being disposed in the second mold half and being movable toward and away from the first mold half and operative when the first and second mold halves have been opened;

arranging the first elector means to be engageable with at least one longitudinal end region of the mold cavity;

arranging in the mold cavity a core rod having a center region on which polymeric material to be molded and at least one longitudinal end portion which is not to be covered by polymeric material, adapting the first and second mold halves to retain the core rod and providing at least one end ring disposed on the at least one end portion of the core rod;

arranging the first ejector means to be engageable with the at least one end ring on the core rod;

adapting the first and second mold halves to be tightened against each other under a predetermined tightening force to define the mold cavity, and providing resilient means for urging the first ejector means toward the second mold half, the resilient means exerting a resilient force to the first ejector means, which force is less than the tightening force of the mold halves;

retracting the first ejector means against the resilient force of the resilient means wherein a part of the distal portion of the first ejector means contacts the second lower mold half and the other distal portion retains the core rod with at least one end ring when the mold halves are closed;

injecting a polymeric material into the mold cavity, thereby forming a composite insulator;

opening the mold halves and ejecting the composite insulator from the first and second mold halves by operation of at least one of the first and second ejector means; and removing the composite insulator from the first upper mold half by applying the resilient force to the first ejector means during the opening of the mold halves so as to urge the composite insulator against the second lower mold half.

7. The method of claim 6, further comprising providing a stopper means which is engageable with the first ejector means, for limiting movement of the first ejector means toward the second mold half.

8. The method of claim 6, wherein a distal portion of one of the first and second ejector means is generally arcuate in shape.

9. The method of claim 8, wherein the arcuate shape is semicircular.

* * * * *